United States Patent [19]
Randolph et al.

[11] Patent Number: 5,618,511
[45] Date of Patent: Apr. 8, 1997

[54] PROCESS FOR PRODUCING AMMONIUM SULFATE FROM FLUE-GAS SCRUBBER WASTE LIQUOR

[75] Inventors: Alan D. Randolph; Sudarsan Mukhopadhyay, both of Tucson, Ariz.; Taeg M. Kwon, Seoul, Rep. of Korea

[73] Assignee: The Arizona Board of Regents on behalf of the University of Arizona, Tucson, Ariz.

[21] Appl. No.: 516,346

[22] Filed: Aug. 11, 1995

(Under 37 CFR 1.47)

[51] Int. Cl.$^6$ .................. C01C 1/24; C01F 11/46
[52] U.S. Cl. .................. 423/545; 423/549; 423/555; 423/243.11; 23/304
[58] Field of Search .................. 423/243.11, 549, 423/555, 243.01, 545; 23/304

[56] References Cited

U.S. PATENT DOCUMENTS

| | | | |
|---|---|---|---|
| 2,781,245 | 2/1957 | Robertson et al. | 423/357 |
| 4,294,807 | 10/1981 | Randolph | 423/242 |
| 4,740,362 | 4/1988 | Claerbout et al. | 423/242 |
| 5,124,265 | 6/1992 | Randolph | 436/55 |
| 5,200,160 | 4/1993 | Benson et al. | 423/235 |
| 5,213,782 | 5/1993 | Moser et al. | 423/243.1 |
| 5,246,677 | 9/1993 | Moser et al. | 423/243.08 |
| 5,384,111 | 1/1995 | Tseng et al. | 423/242.1 |

FOREIGN PATENT DOCUMENTS

| | | | |
|---|---|---|---|
| 53-103997 | 9/1978 | Japan | 423/555 |
| 53-138974 | 12/1978 | Japan | 423/243.11 |

OTHER PUBLICATIONS

Chang, S.G., in "Technical Analyses of a Wet Process for Flue Gas Simultaneous Desulfurization and Denitrification," in Fossil Fuels Utilization: Environmental Concerns, Markuszwesk, R., Blaustem, B.D., Eds., ACS Symposium Series, No. 319, 159–175, 1986 (No Month).

*Primary Examiner*—Gary P. Straub
*Assistant Examiner*—Timothy G. Vanoy
*Attorney, Agent, or Firm*—Antonio R. Durando

[57] ABSTRACT

A flue-gas scrubbing-liquor regeneration process that is based on contacting N-S compounds contained in a flue-gas scrubbing liquor with a lime/limestone solution in a double draw-off crystallizer under suitable pH conditions for precipitating calcium salts of N-S compounds. The precipitated crop is filtered and then hydrolyzed in a sulfuric acid environment to produce gypsum and ammonium sulfate in solution. The hydrolyzed slurry is filtered and the filtrate is neutralized with lime to liberate ammonia gas that is then sparged through a sulfuric acid solution to cause the precipitation of commercial-grade ammonium sulfate.

23 Claims, 13 Drawing Sheets

PROCESS FOR PRODUCING AMMONIUM SULFATE FROM FLUE-GAS SCRUBBER WASTE LIQUOR

BACKGROUND OF THE INVENTION

1. Field of the Invention

This invention pertains in general to an improved method for removing sulfur and nitrogen oxides from flue gases. In particular, it relates to a method for converting flue-gas sulfur and nitrogen oxides to commercial-grade ammonium sulfate during the process of regeneration of scrubbing liquors.

2. Description of the Prior Art

Fossil-fuel combustion produces sulfur and nitrogen oxide pollutants that must be substantially removed from flue gases prior to their discharge to the atmosphere. This requirement introduces a material expense to plant operations and is particularly significant in the case of coal-operated power plants. Therefore, much effort has been devoted to the optimization of flue-gas scrubbing processes and to the development of alternative solutions to the problem of sulfur and nitrogen oxides removal.

The removal of these compounds from flue gases is typically achieved by well known processes wherein the flue gases are contacted with a wet scrubbing slurry containing reactants that cause the sulfur and nitrogen oxides to precipitate out of the gas stream. Calcium hydroxide, sometimes also containing parts of magnesium hydroxide, and ferrous ethylenediaminetetraacetic acid ($Fe^{II}$.EDTA) are known to be very effective for the removal of sulfur and nitrogen oxides. Accordingly, various similar processes utilize aqueous solutions of lime and/or limestone (CaO and $CaCO_3$, respectively) as the scrubbing liquor and $Fe^{II}$.EDTA is added as a promoter for the removal of nitrogen oxides. See, for example, U.S. Pat. No. 5,200,160, which describes a method for optimizing the utilization of $Fe^{II}$.EDTA in such a process.

A characteristic aspect of such CaO/$Fe^{II}$.EDTA wet scrubbing processes for the simultaneous removal of SOx and NOx is the accumulation, in addition to solid calcium sulfite ($CaSO_3 \cdot \frac{1}{2}H_2O$), of nitrogen and sulfur compounds (N-S compounds) in the scrubbing liquor (FGL). These compounds assume a variety of compositions, mainly consisting of hydroxylamine disulfonic acid (HADS), hydroxylamine monosulfonic acid (HAMS), amine trisulfonic acid (ATS), amine disulfonic acid (ADS), sulfamic acid (SA), and hydroxylamine (HA). Although not certain, the major reaction pathways of N-S compounds in a wet scrubbing solution have probably been shown by Chang, S.G., in "Technical Analyses of a Wet Process for Flue Gas Simultaneous Desulfurization and Denitrification," in Fossil Fuels Utilization: Environmental Concerns, Markuszwesk, R., Blaustem, B. D., Eds., ACS Symposium Series, No. 319, 159–175, 1986, and are illustrated in FIG. 1. These N-S compounds are preferably removed from the scrubbing liquor before it is either discarded or recycled.

Since most scrubbing processes utilize lime/limestone in the scrubbing liquor, a precipitate of calcium sulfate and sulfite ($CaSO_4$/$CaSO_3$) is produced in the liquor during scrubbing. In the case of CaO/MgO/$Fe^{II}$.EDTA scrubbers, we found that what was previously considered to be simply a $CaSO_4$/$CaSO_3$ mixture in fact contains a significant amount of N-S compounds. These precipitates are usually dumped in landfills; therefore, it would be desirable to remove them prior to dumping.

Some processes for achieving that end treat the scrubbing liquor effluent from the flue-gas scrubber with sulfuric acid in order to decompose the N-S compounds by hydrolysis. See, for example, the Chisso Engineering Process and the Mitsubishi Heavy Industry Process. Because sulfuric acid is added to the scrubbing liquor (which is more than 95 weight-percent water and, therefore, requires large amounts of acid), this type of process has not been economical. Another known process (e.g., the Asahi Chemical Process) selectively separates the N-S compounds from the scrubbing liquor and then decomposes them to yield $N_2$. Because no marketable byproduct is obtained from the decomposition of the N-S compounds, this type of process is also considered less than economical. Yet another process (upon which the invention of U.S. Pat. No. 5,200,160 is based) recycles a portion of the aqueous scrubbing slurry discharged from the liquid scrubbing unit and passes the remainder through a thickener where a clarified liquor and a thickener underflow are produced. The clarified liquor is returned to the scrubbing unit, while the underflow is further treated to remove sulfur and nitrogen components in a separate operation from the scrubbing process.

In an effort to improve these processes, we have previously focused our work on experiments based on the use of $K_2SO_4$ to isolate the N-S components of spent flue-gas scrubbing liquor. The N-S compounds were precipitated as potassium salts by a metathetical reaction with $K_2SO_4$. The solid potassium salts were then converted by hydrolysis in a sulfuric acid environment to ammonium and potassium sulfates that constitute a salable product as a mixed fertilizer. This investigation revealed that more than 60% of the added potassium remained in the scrubbing liquor after precipitation of the N-S compounds as potassium salts. Therefore, the loss of dissolved potassium in the recycled mother liquor to the scrubbing unit, probably as entrainment on the gypsum precipitate, is a serious detriment to the economic viability of this regeneration process.

This invention is directed at a process that avoids the environmental and economic problems of prior-art methods; at the same time, it enhances the economic viability of scrubbing-liquor regeneration by directly producing commercial-grade ammonium sulfate and Ca/Mg sulfates from the N-S compounds removed from flue gases. The invention incorporates the recovery of nitrogen and sulfur with the scrubbing-liquor regeneration process itself, rather than viewing such recovery only as a separate, potentially-useful downstream option.

SUMMARY OF THE INVENTION

One of the objectives of this invention is an N-S recovery process that can be carried out economically in conjunction with the waste scrubbing-liquor regeneration process of conventional lime/limestone scrubbers.

In particular, an objective of the invention is an N-S recovery process that can be carried out economically with the scrubbing-liquor process of CaO/$Fe^{II}$.EDTA scrubbers.

Another objective is the regeneration of flue gas liquors and the recovery of N-S compounds in processes that utilize lime/limestone containing magnesium.

Another goal is an N-S recovery process that takes advantage of the availability of lime and/or limestone at the scrubber site, thereby simplifying the operation and minimizing costs of raw materials.

Yet another goal is a recovery process that produces a precipitate of acceptable filterability, so that a recyclable regenerated scrubbing liquor is efficiently produced.

Yet another objective is the conversion of the salts produced by precipitation from N-S containing compounds into ammonium sulfate of acceptable quality for sale as commercial fertilizer and calcium/magnesium sulfates suitable for soil conditioning.

Still another goal is a method of N-S recovery that can be implemented in a continuous process.

Finally, an objective of this invention is the realization of the above mentioned goals in an economical and commercially viable manner.

According to the foregoing objectives, one aspect of the process of this invention involves the addition of lime/limestone to a bleed of the scrubbing liquor effluent from a flue-gas scrubbing unit in order to precipitate N-S compounds from the liquid phase. The mother liquor, stripped of the precipitates by a filter, is recycled back to the scrubber unit while a bleed of the mother liquor is placed in a double draw-off (DDO) crystallizer where additional lime/limestone (CAO/MgO) is added to precipitate N-S crystal components which are further treated to produce ammonium sulfate.

According to another aspect of the invention, the N-S compounds (substantially all calcium-amine-sulfonate salts, such as calcium amine disulfonate—CaADS) are hydrolyzed with approximately one-molar $H_2SO_4$ at about 95°–100° C., either at atmospheric pressure or in an autoclave, to convert the N-S compounds into a slurry of calcium sulfate in an ammonium sulfate solution. After completion of hydrolysis, the slurry is filtered to remove the insoluble gypsum produced by the additional lime added to the DDO crystallizer and the filtrate of $(NH_4)_2SO_4$ solution is neutralized with ammonia produced by sparging air in the hydrolysis liquor in a separate vessel.

According to another aspect of the invention directed particularly at flue-gas liquors that contain magnesium salts, the ammonium sulfate solution produced by hydrolysis is neutralized with lime/limestone to produce ammonia gas and a calcium/magnesium sulfate slurry. The slurry is blown with air and the resulting ammonia/air gas stream is sparged through a sulfuric acid solution to produce pure ammonium sulfate. Alternatively, a waste acid (e.g., pickle liquor) may be used to produce fertilizer-grade ammonium sulfate. As a third option, the ammonia gas can be used to partially neutralize the remainder of the hydrolysate. In all cases the ammonium-ion-containing solutions must be evaporated to produce ammonium sulfate or ammonium-sulfate-containing fertilizer materials.

Various other purposes and advantages of this invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DETAILED DESCRIPTION OF THE INVENTION

The heart of this invention lies in the discovery that under predetermined operating conditions N-S compounds in spent flue-gas scrubber mother liquor can be recovered by precipitation as calcium salts of N-S compounds (such as CaADS), and the further discovery that these salts in turn can be hydrolyzed in a sulfuric acid environment to yield ammonium sulfate. The hydrolysis process may be carried out according to various alternatives suitable for different scrubbing operations.

Figure 1:
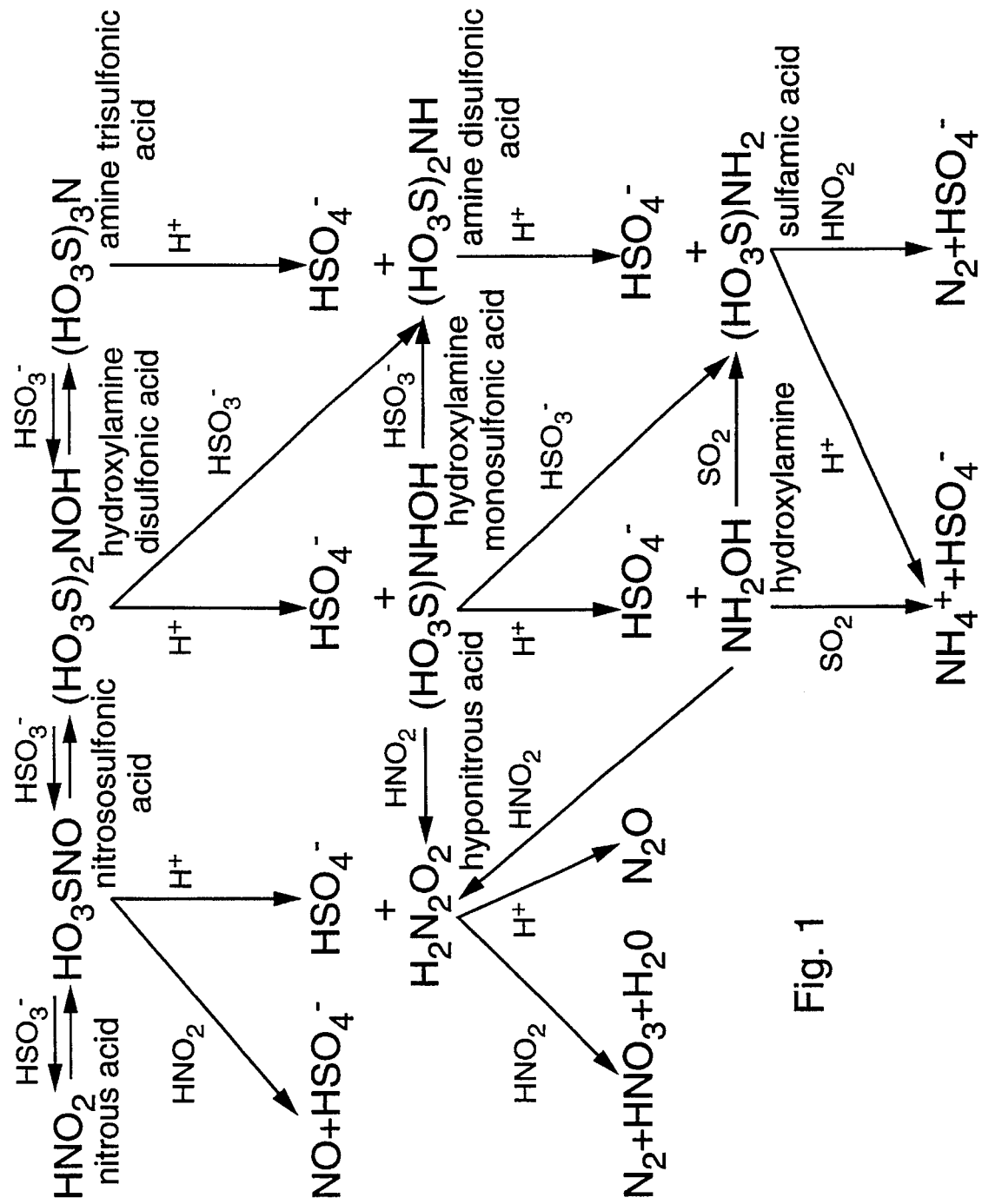
FIG. 1 is a schematic representation of the major reaction pathways of N-S compounds in a wet scrubbing solution.
Figure 2:
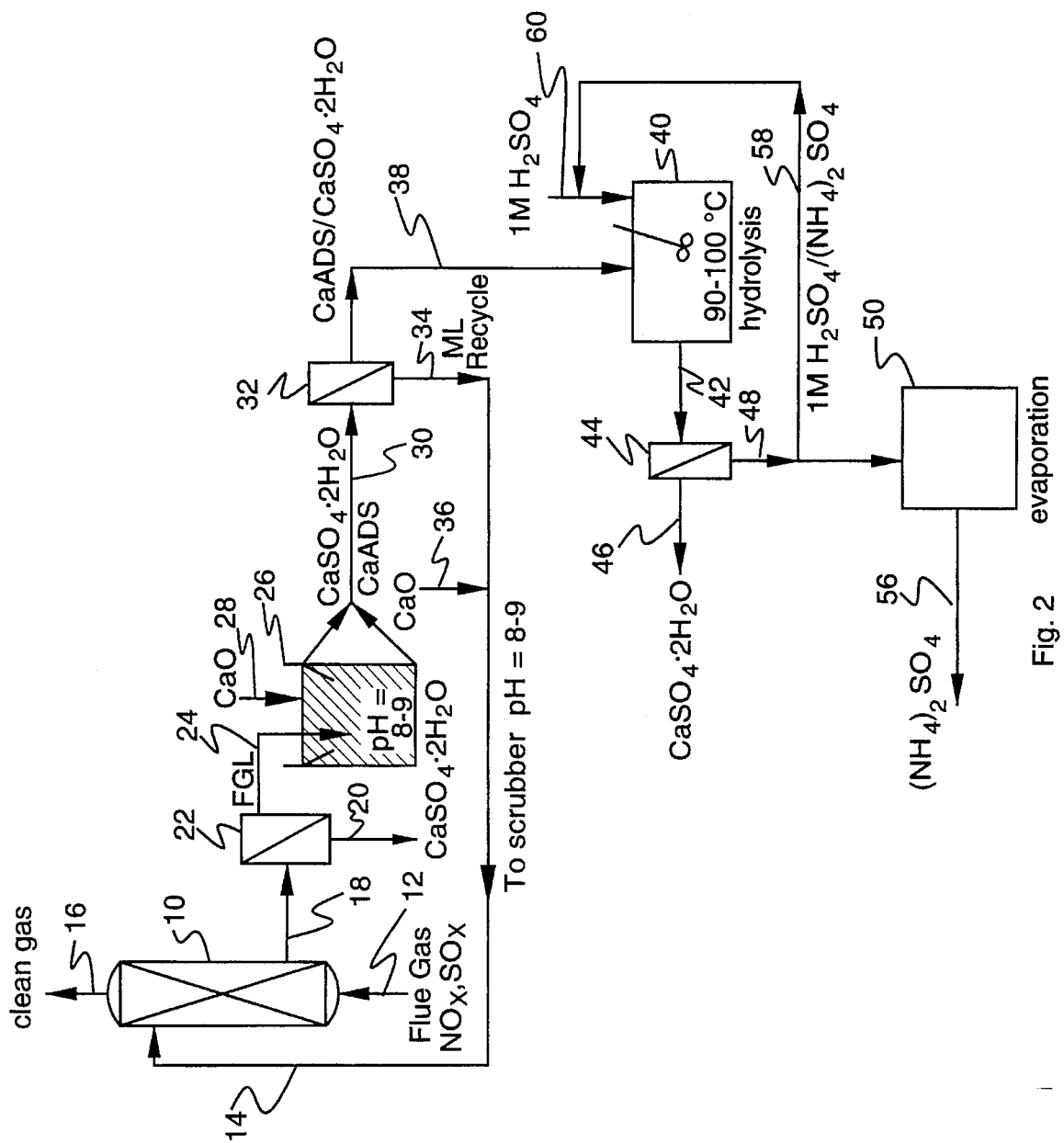
FIG. 2 is a process flow diagram of a lime/limestone scrubbing operation including one embodiment of the flue-gas liquid regeneration and N-S recovery process of this invention.

Referring to the drawings, wherein like parts are designated throughout with like numerals and symbols, FIG. 2 shows the process flow diagram and a schematic representation of the apparatus of the invention as applied to a conventional lime/limestone scrubbing operation. A scrubber 10 is provided for contacting, preferably in countercurrent flow, a flue-gas introduced through an inlet line 12 with an aqueous scrubbing-slurry (mother liquor, ML) of calcium components, such as lime and/or limestone, introduced through line 14. The scrubbing operation generates a clean gas released to the atmosphere through outlet 16 and a spent slurry containing mainly solid gypsum and N-S compounds in solution. The spent slurry is fed through line 18 to a filter 22 where a product containing $CaSO_3/CaSO_4$ is discharged at line 20 and a flue-gas liquid (FGL) stream is produced as a filtrate. The process of regeneration of this FGL stream by removal of its N-S constituents before it is recycled to the scrubber 10 constitutes the novelty of this invention.

According to the first aspect of the invention, the FGL stream is fed through a line 24 to a crystallizer 26, preferably a double draw-off (DDO) crystallizer, where a lime/limestone slurry is added through line 28 to effect the recovery, under controlled operating conditions discussed in detail below, of substantially all N-S compounds as a filterable precipitate. We discovered that this step can be achieved efficiently when the pH of the crystallizer is kept between 8.0 and 9.0, optimally at about pH 8.3. The combined output from the crystallizer 26 is then passed through line 30 to a filter 32 where the solid components (substantially all calcium salts of N-S compounds and gypsum) are separated from the mother liquor. The liquid-filtrate stream from line 34 is combined with a make-up lime/limestone slurry added through line 36 and recycled to the scrubber 10 through the inlet line 14. It is noted that the calcium salts of N-S compounds precipitated in the crystallizer 26 are believed to consist mostly of calcium amine disulfonate (also called calcium imido disulfonate, CaADS); therefore, for simplicity of description they are collectively referred to herein as CaADS.

The precipitate isolated in filter 32, containing calcium salts of N-S compounds and gypsum, is passed on through line 38 to further processing according to another aspect of the present invention. This solid output from the filter is advanced to a hydrolyzer 40 containing a 0.1–5 molar solution of sulfuric acid, preferably 0.2–2.0 molar and even more preferably approximately one-molar, at about 90° to 100° degrees C., either at atmospheric or higher pressure, which causes the formation of more gypsum and the conversion of CaADS to ammonium sulfate in solution. Due to the high acidity of the hydrolyzed liquor, the ammonium sulfate and its bisulfate, if present, remain in soluble form. The effluent slurry is fed to a filter 44 through line 42 to yield a pure gypsum product at outlet 46 and a filtrate stream containing ammonium sulfate in line 48. The filtrate stream is then collected in an evaporation tank 50 where it is evaporated to yield pure ammonium sulfate through line 56. Preferably, a portion of the filtrate stream in line 48 is recycled through line 58 to the hydrolyzer 40 in combination with make-up sulfuric acid introduced through line 60, if necessary.

It is noted that the concentration of the sulfuric acid solution in the hydrolyzer may differ from one-molar, as one skilled in the art would understand. In fact, hydrolysis of CaADS was conducted successfully in experiments from 0.1-molar to 2.0-molar concentrations, with preferable results at 0.3 molar to 2.0 molar, and it is expected that it could be accomplished successfully in molar concentrations outside the 0.1 to 2.0 range. Based on chemical principles, it is expected that hydrolysis of N-S compounds would occur at different rates in $H_2SO_4$ concentrations ranging from the minimum stoichiometric requirements necessary to support the hydrolysis up to the commercially-available saturated solutions of approximately 18 molar. In practice, though, it is believed that a molarity above 5 would be uneconomical. The molarity of one was chosen as a typical experimental concentration and was found to be very effective and, therefore, preferred. During the hydrolytic conversion of calcium-amine-sulfonate salts to gypsum and ammonium sulfate, all of the sulfur is converted to sulfuric acid ions, whereby a net gain results that satisfies the continued acid demands of the hydrolyzer during continuous operation. Thus, we found that no make-up of sulfuric acid is necessary once the hydrolytic process is initiated.

It is also noted that this process effects the regeneration of the flue-gas liquid by removing essentially all of the nitrogen and sulfur compounds using lime/limestone, a material already available on site because it is required for the scrubbing operation. Moreover, the recovery of N-S compounds and their transformation to useful products (ammonium sulfate and gypsum) is carried out by processing only the solid components of the slurry generated by the initial reaction between flue-gas liquor and lime. Therefore, savings are achieved by the smaller-scale equipment and smaller amounts of chemicals required for the process.

Figure 3:
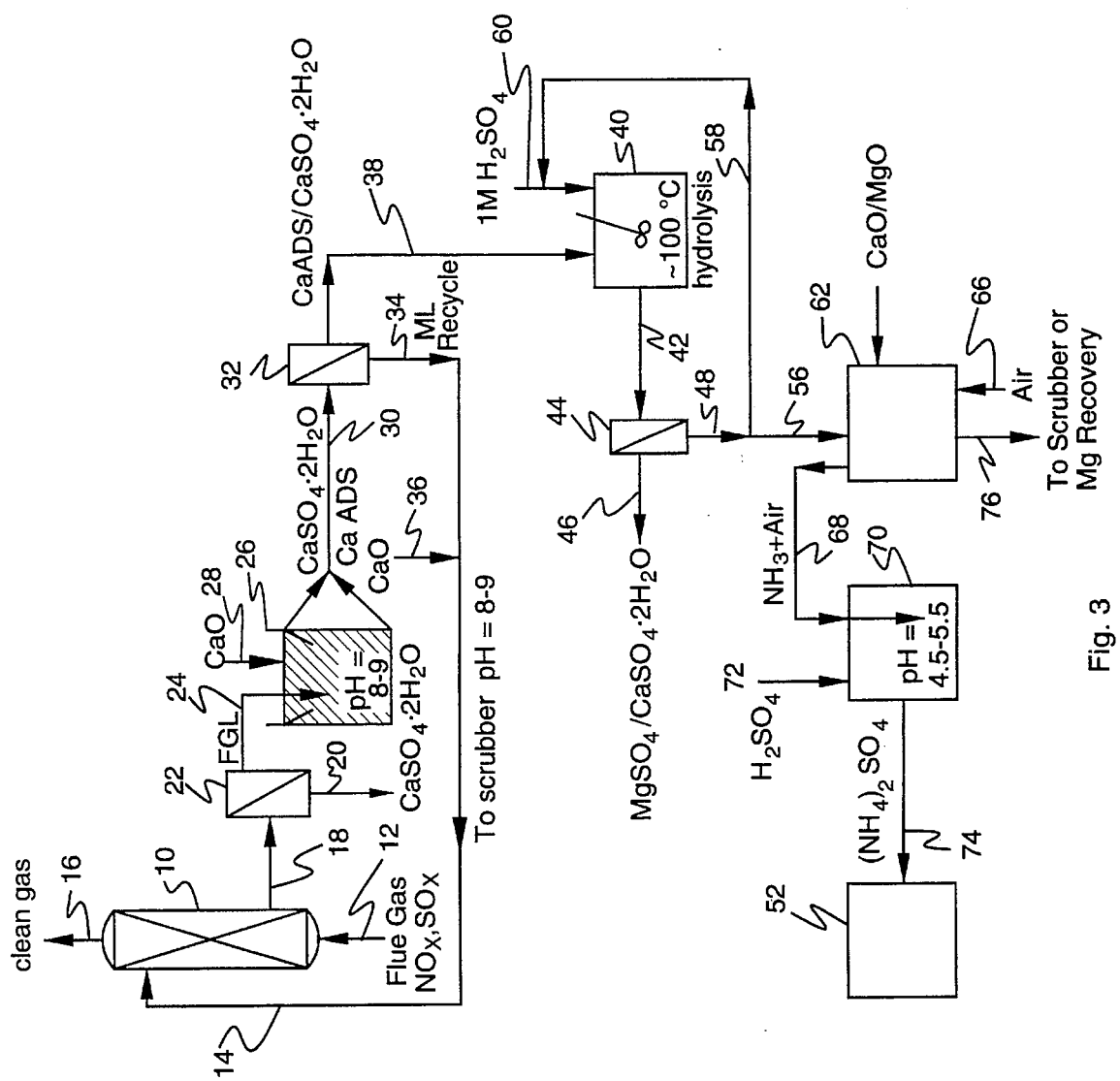
FIG. 3 is a process flow diagram of a lime/limestone scrubbing operation including another embodiment of the flue-gas liquid regeneration and N-S recovery process of this invention.

An alternative embodiment of the method of the invention is disclosed for flue-gas scrubbers utilizing limes that contain magnesium constituents, such as the lime sold by the Dravo Lime Company of Pittsburgh, Pa., under the trademark Thiosorbic® (about 2 to 7 weight-percent MgO). A process flow diagram and a schematic representation of the apparatus for such scrubbing operation is illustrated in FIG. 3. With the exception of the presence of magnesium in the scrubbing liquor fed to the scrubber 10 through line 14, the process is the same as that of FIG. 2 through the hydrolysis step. Solid magnesium sulfate formed during scrubbing is separated from the mother liquor during filtering in filter 32 and passed on with CaADS and gypsum to the hydrolyzer 40. As mentioned, selective precipitation by cooling or heating after hydrolysis is very difficult. Therefore, we found that it is easier to separate the two by precipitating $(NH_4)_2SO_4$ in a gas-phase process.

The crystals separated in filter 32 of FIG. 3 are hydrolyzed in sulfuric acid, preferably in approximately one-molar solution, at about 90°–100° C., preferably 95° C., producing a white crystal substance and ammonium ion in solution. The crystals substance consists of calcium sulfate and is isolated in filter 44, leaving a hydrolyzed liquor that contains ammonium sulfate and magnesium sulfate. A portion of this filtrate stream from line 48 is recycled through line 58 to the hydrolyzer 40 to maintain the acidity of the hydrolyzer, as in the embodiment of FIG. 2. According to the modified recovery process of FIG. 3, the remainder of the filtrate in line 48 is fed to a neutralizer tank 62 through line 56 and contacted with an aqueous lime solution provided by line 64 to produce ammonia. Air is preferably also introduced into tank 62 through line 66 and the ammonia/air mixture resulting from the production of $NH_3$ is removed through line 68. The mixture is then passed to a precipitator vessel 70 where it is sparged through a sulfuric acid solution to produce a pure ammonium-sulfate precipitate. The pH of the solution in precipitator 70 is kept at about 4.5–5.5, which is typical for $(NH_4)_2SO_4$ manufacture by direct contact of ammonia with sulfuric acid. To that end, sulfuric acid is added to precipitator 70 through line 72 as necessary. Pure ammonium sulfate is then passed on through line 74 for recovery in an evaporator 52 or in equivalent apparatus. Finally, the effluent lime solution from the neutralizer tank 62 is either recycled to the scrubber 10 through line 76 or passed to a magnesium recovery section (not shown in the drawings) according to processes known in the art.

The key idea of this modified version of the process of the invention is the fact that the liquid solution from the hydrolyzer 40 is treated with lime to produce ammonia gas, rather than evaporated to yield ammonium sulfate directly. This step permits the complete separation of the ammonium ion from the magnesium sulfate in solution, so that pure ammonium sulfate can be produced. In addition, this method reduces processing costs by preserving a portion of the sulfuric solution for recycling to the hydrolyzer.

Figure 4:
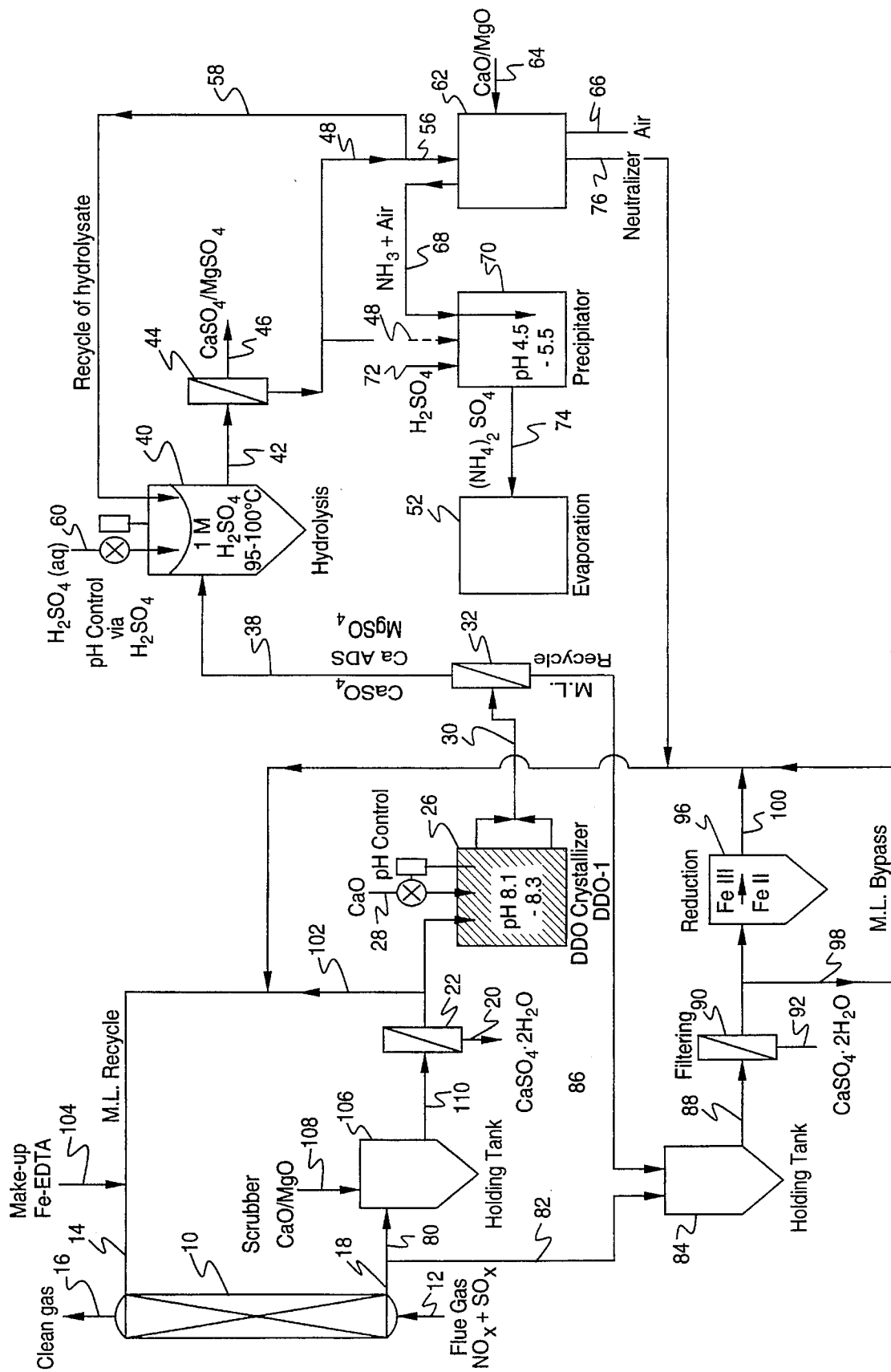
FIG. 4 is a process flow diagram of a $CAO/Fe^{II}.EDTA$ scrubbing operation including a combination of the regeneration processes of FIGS. 2 and 3.

Yet another embodiment of the invention is based on the combination of the process illustrated in FIG. 3 with a conventional CaO/Fe$^{II}$.EDTA process. This embodiment is shown in the schematic process-flow and equipment diagram of FIG. 4 as applied to a typical scrubbing operation that utilizes a lime/limestone slurry that also contains magnesium. A scrubber 10 is provided for contacting, preferably in countercurrent flow, a flue-gas stream with an aqueous scrubbing-slurry stream of magnesium-containing lime and/or limestone. The scrubbing operation generates a clean-gas stream for release to the atmosphere and a spent slurry stream of mother liquor containing solid gypsum and $MgSO_4$, and N-S compounds in solution. Calcium and magnesium sulfites and chlorides may also be present. The spent slurry stream produced at outlet 18 needs to be regenerated by removal of N-S compounds before it is recycled to the scrubber 10.

The flue-gas liquid effluent from line 18 is typically divided into a first, generally larger stream that is passed through line 80 to an N-S recovery section and a second, generally smaller stream that is fed through line 82 to a mother-liquor recycle section. In the recycle section, the stream in line 82 is combined in a holding tank 84 with a stream of regenerated mother liquor fed through line 86 and the resulting combined mother-liquor stream is passed (through line 88) to a filter 90. By filtration, the solid components in the slurry (gypsum and other solids generated during the scrubbing operation) are separated (through line 92) from the mother-liquor filtrate. A portion of the filtrate stream is passed through line 94 to a reducing tank 96 where ferric .EDTA is reduced to ferrous. EDTA to increase the scrubbing activity of the recycled mother liquor, while another portion bypasses the reducing tank in line 98 and is combined with the effluent line 100 from the reducing tank 96 to form a mother-liquor stream that is recycled to the scrubber 10. An additional mother-liquor stream in line 102 from the recovery section and a make-up Fe$^{II}$.EDTA stream in line 104 are added to produce the aqueous scrubbing-slurry fed to the scrubber 10 through line 14.

As in the embodiments of FIGS. 2 and 3, the recovery section comprises precipitation and hydrolysis apparatus according to the present invention, wherein the latter combines the teachings of both methods disclosed above. The spent mother-liquor stream in line 80 is collected in a holding tank 106 where make-up lime/limestone is added through line 108. The resulting slurry is then passed through line 110 to a filter 22 to isolate the gypsum and other solids produced during the scrubbing operation.

These solids are removed through line 20 and the filtrate flue-gas liquid is partly directly recycled through line 102 and partly fed to a crystallizer 26 for the recovery of N-S compounds. A lime/limestone slurry is added through line 28 under controlled pH conditions, discussed below, to recover all N-S compounds as a filterable precipitate. The combined slurry output from the crystallizer 26 is then passed through line 30 to a filter 32 and the liquid filtrate is recycled to the holding tank 84 of the recycle section through line 86. The precipitate isolated in filter 32, which contains mostly CaADS and $CaSO_4$, is passed on to the hydrolyzer 40 through line 38.

The hydrolyzer 40 contains an approximately one-molar solution of sulfuric acid at about 90°–100° degrees C., which causes the formation of calcium/magnesium sulfates and the conversion of substantially all CaADS to ammonium sulfate. Again, due to the high acidity of the hydrolyzed liquor, ammonium and magnesium sulfates and their bisulfates, if present, remain in soluble form. The effluent slurry from the hydrolyzer 40 is fed to a filter 44 through line 42 to yield a pure $CaSO_4/MgSO_4$ product at outlet 46 and a filtrate stream containing ammonium sulfate and magnesium sulfate in solution in line 48. A portion of the filtrate stream from line 48 is recycled through line 58 to the hydrolyzer 40 to maintain the acidity of the hydrolyzer, as in the embodiment of FIG. 3. The remainder of the filtrate out of line 48 is fed to a neutralizer tank 62 through line 56 and contacted with an aqueous lime solution provided through line 64 to produce ammonia gas. Air is introduced into tank 62 through line 66 and the ammonia/air mixture resulting from the production of $NH_3$ is removed through line 68. The mixture is then passed to a precipitator vessel 70 where it is sparged through a sulfuric acid solution to produce a pure ammonium-sulfate precipitate. The pH of the solution in vessel 70 is kept at about 4.5–5.5 by adding sulfuric acid through line 72. The resulting solution of pure ammonium sulfate is passed to an evaporator 52 through line 74 for recovery of ammonium sulfate crystals. Finally, the effluent lime solution from the neutralizer tank 62 is recycled to the scrubber 10 through line 76.

One important feature of this version of the invention is the utilization of the sulfuric effluent from filter 44 to effect both the hydrolysis and the gas-phase processes. Accordingly, the approximately one-molar sulfuric acid solution saturated with ammonium sulfate obtained from filter 44 is split into two streams. As explained above, the first stream is recycled through line 58 to the hydrolyzer 40 to provide the sulfuric ions required to sustain hydrolysis. The second stream is used, through line 56, to provide the ammonium ions required to liberate ammonia gas in the neutralizer tank 62. Because of the stoichiometric requirements of the process, we found that an approximately equal split between these two streams is optimal.

For the purpose of optimizing the operating conditions of the process of the invention, experimental investigations were performed to study the precipitation characteristics of N-S compounds in batch as well as continuous operation at ambient conditions (i.e, room temperature and atmospheric pressure). The hydrolysis characteristics of the resulting precipitates were also evaluated in acid hydrolysis experiments. In addition, standard filtration tests were performed to examine the filterability of the N-S compounds precipitated in the crystallizer.

A series of batch experiments involving a wide range of pH values was conducted to study the influence of pH on both the volume of lime slurry required for crystallization and the corresponding amount of calcium-amine-sulfonate salts resulting from precipitation. The experiments were carried out in 300 ml Pyrex conical flasks. 150 ml of waste liquor obtained from a CaO/Fe$^{II}$.EDTA wet scrubbing process were mixed with a known volume of Dravo's 5% weight per volume (w/v, grams/milliliter) Thiosorbic® lime slurry. The pH of such waste liquor is typically kept at about 7.0 in the scrubber. The mixture was allowed to set for several hours with constant stirring and then the pH of the solution was measured. The mixture was then filtered, and the precipitate was dried and weighed. In order to determine the CaADS content of the precipitates, a known amount of crystals was heated to 95° C. in a 1M $H_2SO_4$ solution overnight, and the ammonium ion concentration in the resulting hydrolyzed solution was analyzed. The CaADS content of the crystal was determined assuming that all the $NH_4^+$ ions liberated in the solution originated from CaADS.

Figure 5:
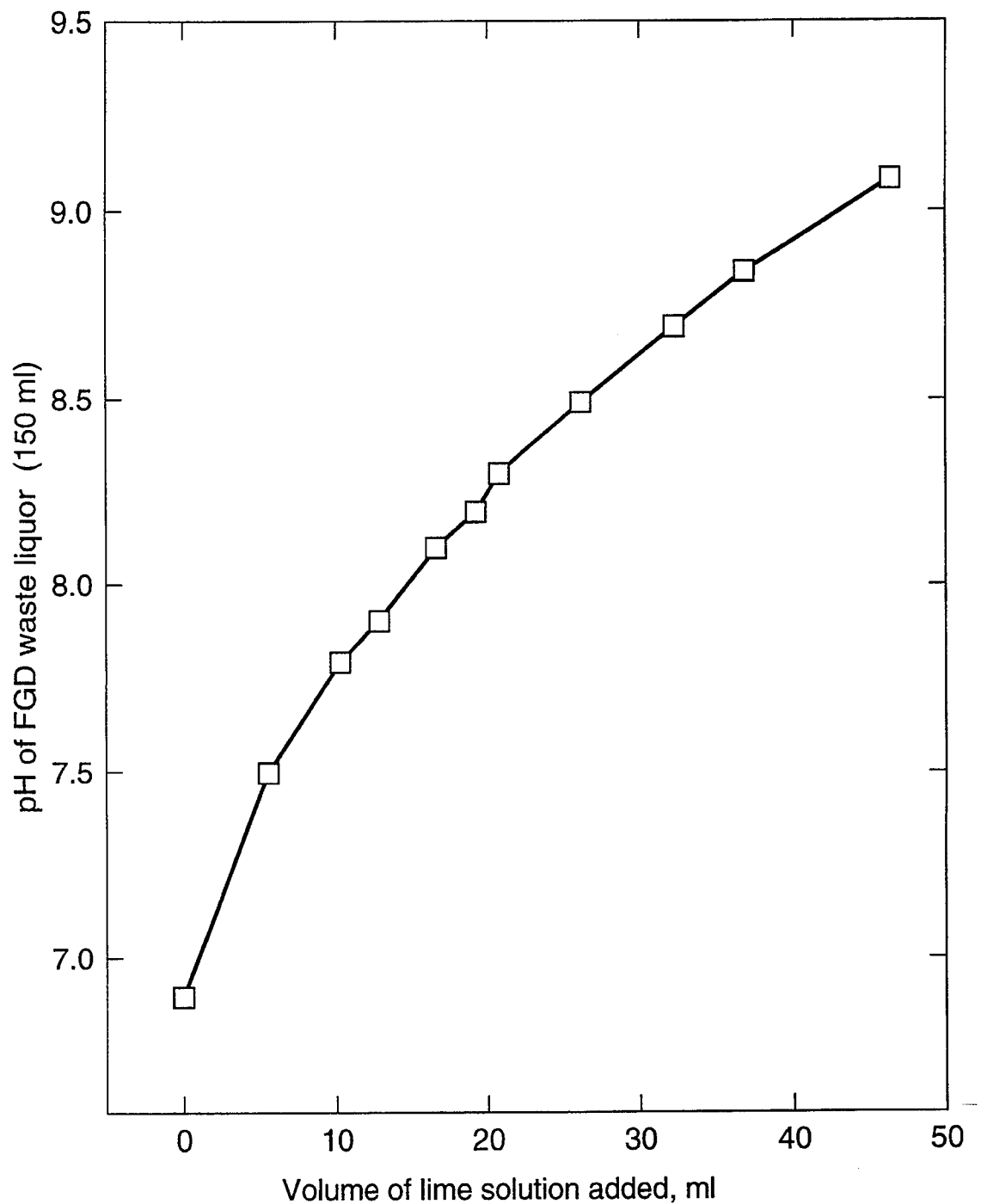
FIG. 5 is a plot showing the change in pH of a typical spent scrubbing mother liquor as a function of the addition of lime.
Figure 6:
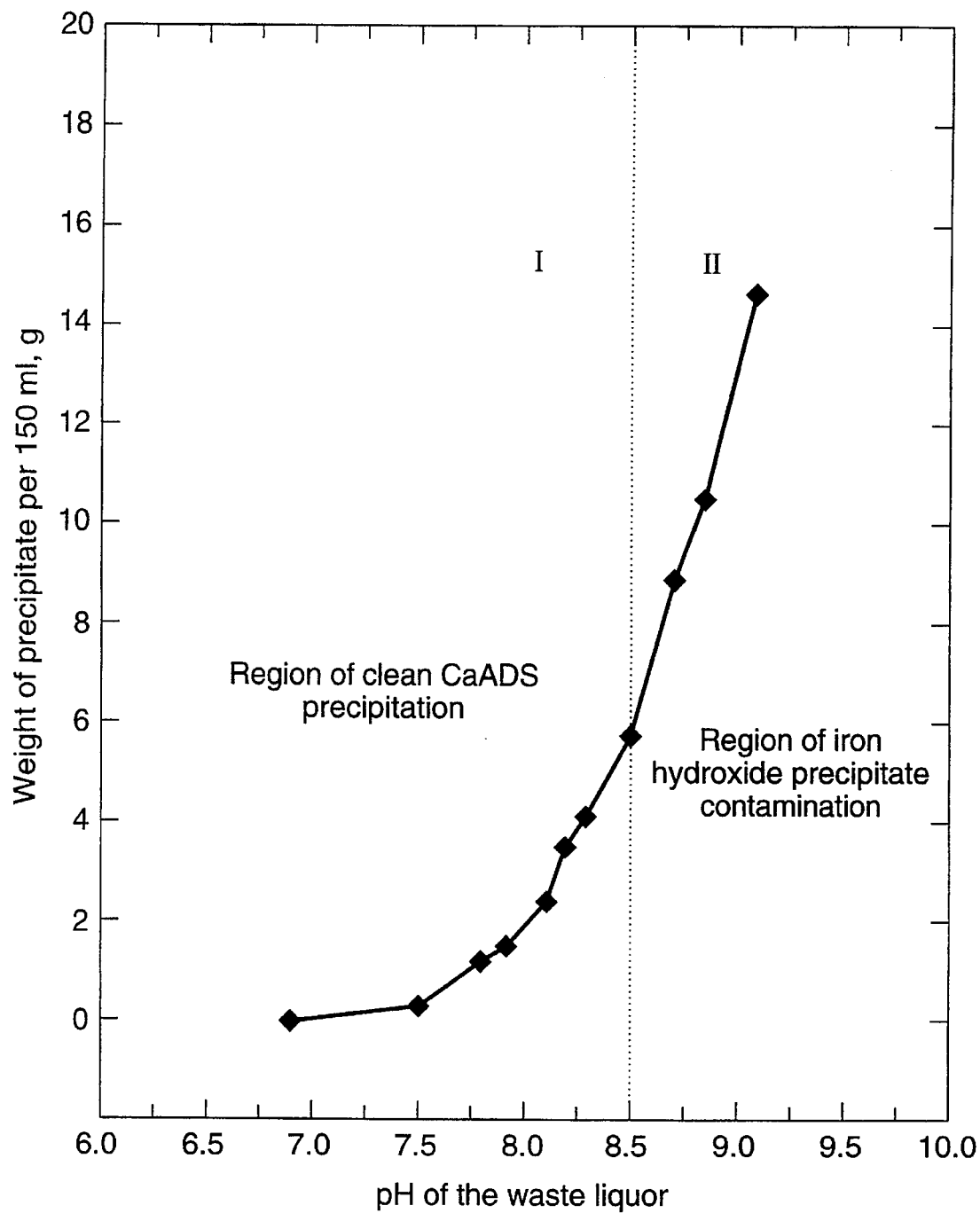
FIG. 6 is a plot showing the total amount of $CaSO_4$, $MgSO_4$ and CaADS precipitate as a function of solution pH produced from the addition of lime to spent mother liquor in a batch operation.

We found that one of the most important characteristics of the precipitation of N-S compounds with lime in a crystallizer is the influence of the slurry's pH. The pH of the liquor was varied from 6.8 to 9.1. The lime solution was found to increase the pH of the mixture monotonically. The change in pH of the liquor, as a function of addition of slaked lime solution, is shown in FIG. 5. The dependence of the amount of precipitated crystals on the solution's pH is given in FIG. 6. The amount of crystal matter precipitated increased with the pH of the liquor but, as illustrated in FIG. 6, the precipitation profile was found to consist of two distinct regions, referenced as I and II. In region I, below about pH 8.5, the amount of precipitate formed in the mixture increased slowly as a function of pH. This region of initial precipitation is where the precipitates are composed mainly of $CaSO_4$ and CaADS. The color of the precipitate is white at pH around 7.5 and gradually turns to yellowish brown as the pH of the mixture approaches 8.5. In region II, above about pH 8.5, the amount of crystal matter precipitated in the liquor increased rapidly with pH. In this region the precipitation of iron hydroxides is significant, thereby turning the crystal product to a brown color. Thus, to avoid excessive precipitation of iron hydroxides, we found that the optimum pH during crystallization should be kept below 8.5, preferably at about 8.3. During continuous DDO crystallization experiments, good results were also obtained while the pH of the slurry was maintained in the neighborhood of 8.3.

Figure 7:
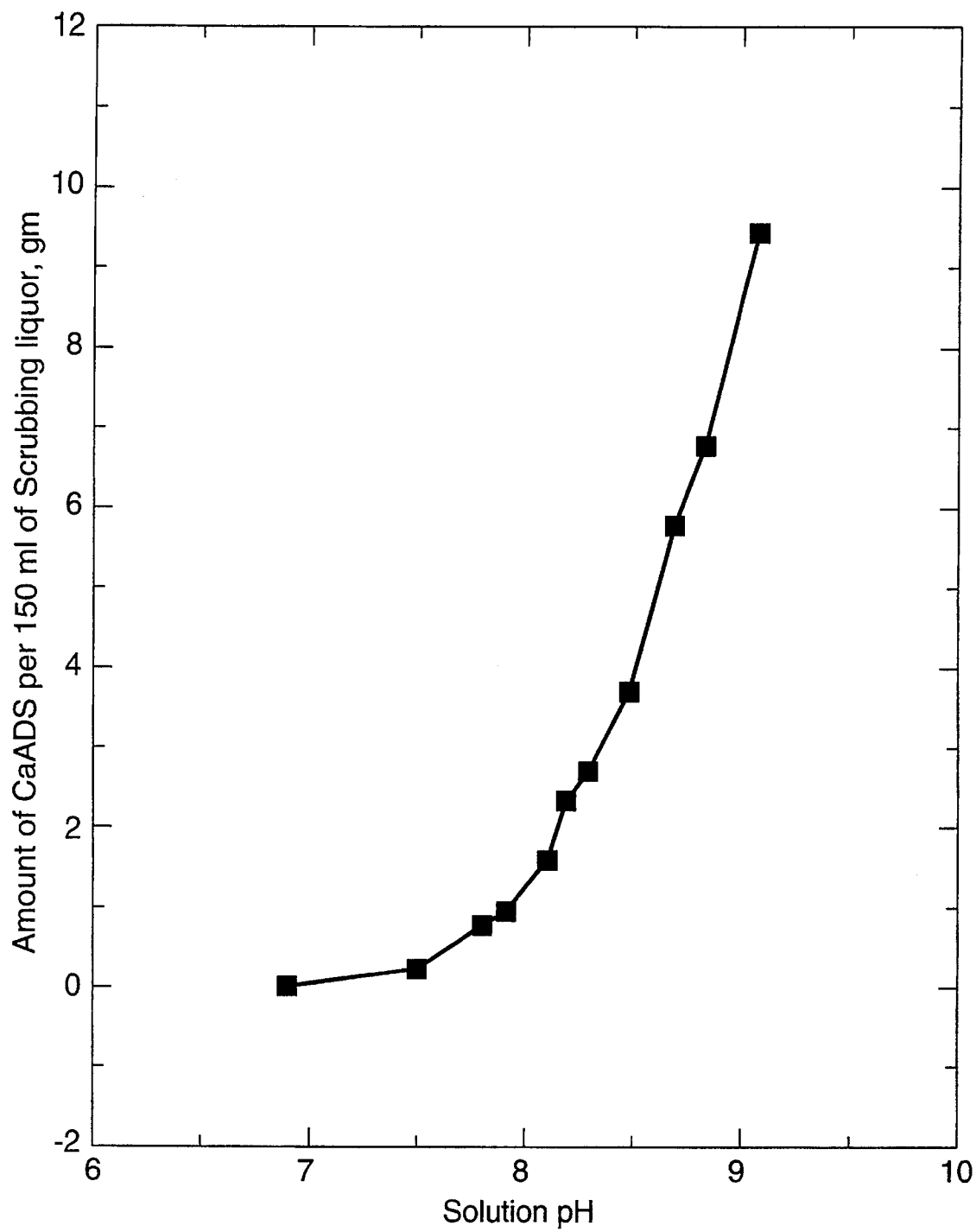
FIG. 7 is a plot showing the amount of CaADS precipitate as a function of solution pH produced from the addition of lime to spent mother liquor in a batch operation.

Analysis of $NH_4^+$ concentration in the solution obtained after acid hydrolysis of the precipitates obtained in the pH range of 7.0 to 9.0 indicated that approximately 64% of the precipitated crystals are equivalent to CaADS, the balance being sulfate salts. The precipitation profile of CaADS at various pH values, due to reaction with Thiosorbic® lime, is given in FIG. 7. Although the CaADS content increased with an increasing pH, the plot shows that at higher pH values (>pH 8.5) the fraction of CaADS in the precipitate decreases due to a marked increase of iron hydroxide formation.

It is noted that the continuous crystallization of calcium amine disulfonates or other calcium-amine-sulfonate salts from flue-gas scrubbing liquor is not reported in the literature. For the purposes of the tests disclosed herein, a bench scale continuous DDO crystallizer was built. As one skilled in the art readily understands, DDO crystallizers employ the principle of a size-dependent residence time to increase the mean size of the particles produced, thereby enhancing the filterability of the slurry. According to DDO-crystallizer operation, a classified overflow stream is removed from the mixed slurry concurrently with a mixed suspension underflow stream. The overflow stream is classified by an arbitrarily chosen fine-cut size. The overflow and underflow streams are then combined to create the slurry product stream. By judiciously selecting the total-throughput to underflow ratio (DDO ratio, R), it has been demonstrated that the mean crystal size from a continuous crystallizer can be significantly increased by using the DDO configuration. Thus, the major advantages of a DDO design over other types of crystallizers are high slurry density, larger crystal size, and correspondingly improved filterability and less vessel fouling.

The experimental continuous precipitation of CaADS was carried out in a 7-liter plexiglass crystallizer. The scrubbing liquor was stored in a 50 gallon feed tank and fed to the crystallizer by a mother-liquor feed pump. The pH of the liquor during reaction was controlled by introducing a pH electrode connected to a controller regulating the rate of lime addition via a lime feed pump, thus making it possible to maintain the pH of the crystallization reaction at the desired setpoint. An approximately 5% (w/v) lime slurry was prepared from Dravo's Thiosorbic® lime. The lime slaking process was performed by adding one part of lime to five parts of deionized water with constant mixing at approximately 300 RPM. The mixture was allowed to stand at room temperature for 15 minutes. The slaked lime slurry was then sieved through a 200 mesh screen to remove sand and insoluble matter and the filtrate slurry was diluted to obtain a 5% solution, which was stored in a five gallon lime-slurry feed tank. We note that the concentration of the lime slurry is not critical to the steps of the invention, but the value of 5% is preferred for the DDO crystallizer because it was found to favor crystal growth and therefore increase the crystal size in the slurry and the efficiency of the process.

The overflow from the DDO crystallizer was continuously drawn off through an inverted, glass cone-tube (3.5 cm in diameter and 30 cm in length). The underflow of the crystallizer was set to discharge approximately every 40 minutes at a high flow rate in order to avoid clogging of the underflow line. A liquid level probe and a controller were incorporated into the system for the periodic discharge of the underflow. During the experiment, samples were drawn from the product line of the crystallizer and filtered. The filter-cake crystals were dried and weighed for estimation of the slurry density. The dry crystals were then sieved for size analysis using an Allen-Bradley sonic shifter. The crystals were also examined in an optical microscope for their habit.

For the continuous precipitation of CaADS crystals, the mean residence time $\tau$ of the crystallizer was fixed at one hour. The pH of the reaction slurry was controlled between 8.2 and 8.3.

Figure 8:
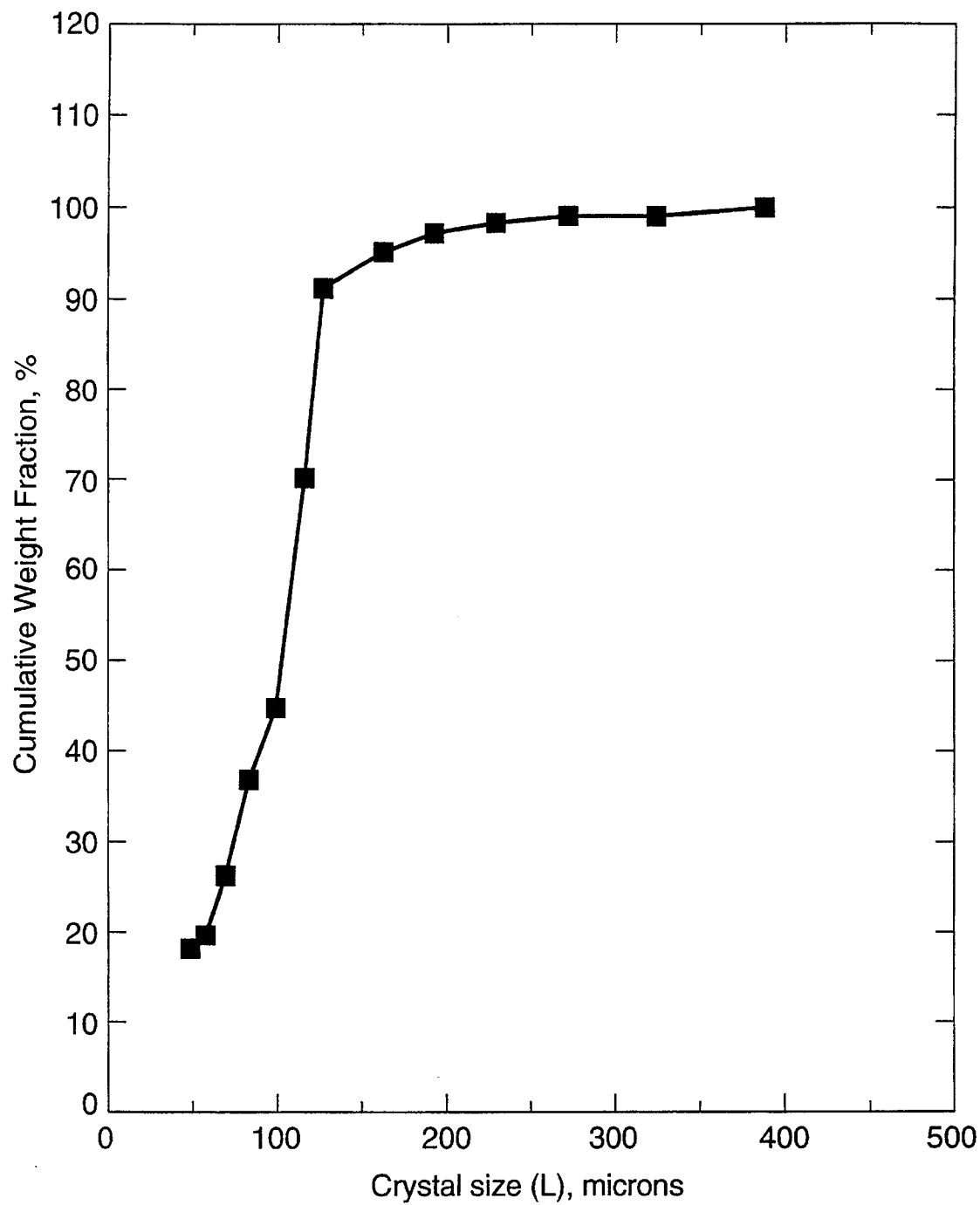
FIG. 8 is a plot showing the cumulative weight fraction of CaADS as a function of crystal size produced from the addition of lime to spent mother liquor in a double draw-off (DDO) crystallizer with a residence time of one hour and a total-throughput to underflow ratio (DDO ratio) of 10.
Figure 9:
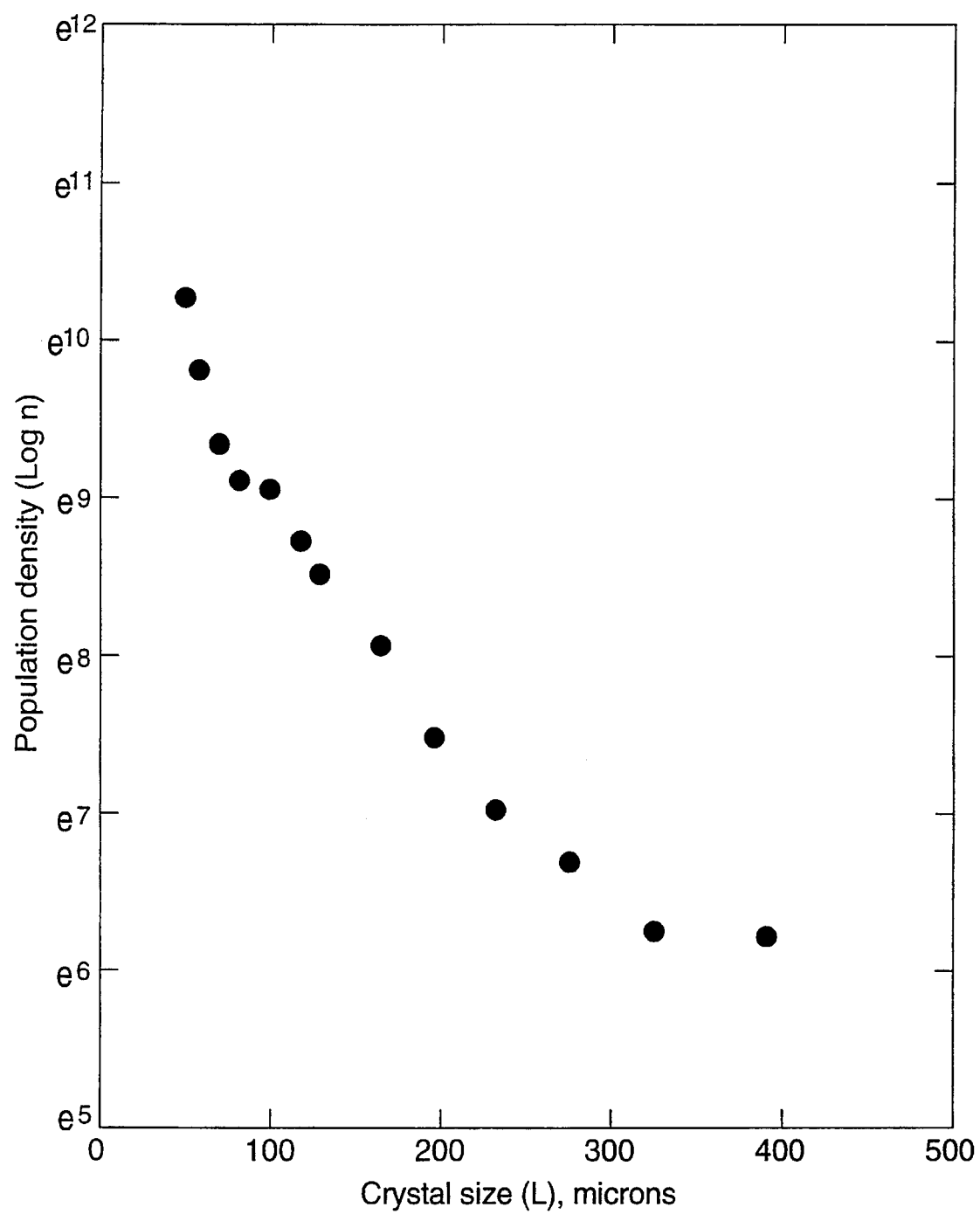
FIG. 9 is a plot of the population density as a function of crystal size of CaADS precipitated under the crystallization conditions of FIG. 8.
Figure 10:
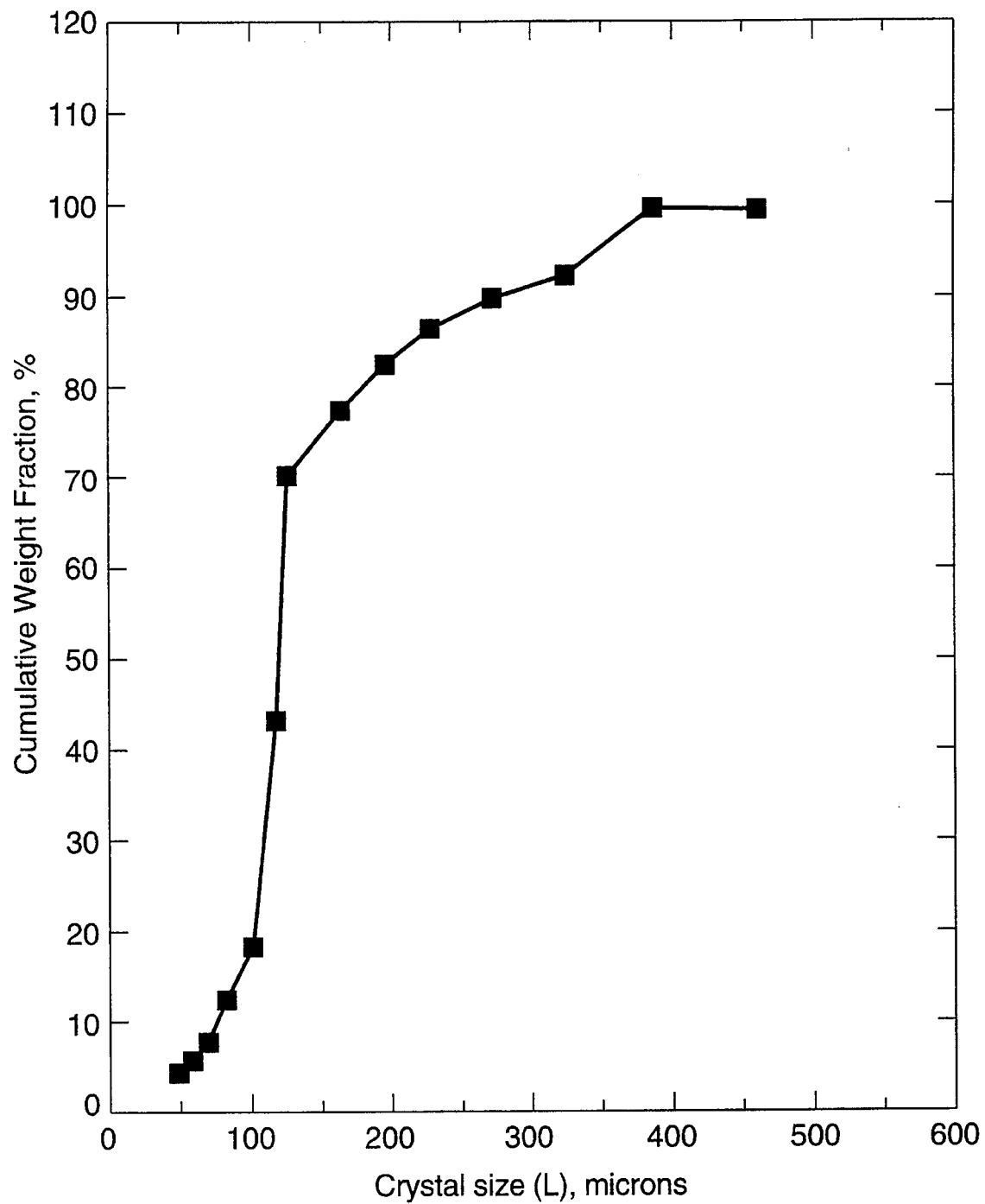
FIG. 10 is a plot showing the cumulative weight fraction of CaADS as a function of crystal size produced from the addition of lime to spent mother liquor in a DDO crystallizer with a residence time of one hour and a DDO ratio of 15.
Figure 11:
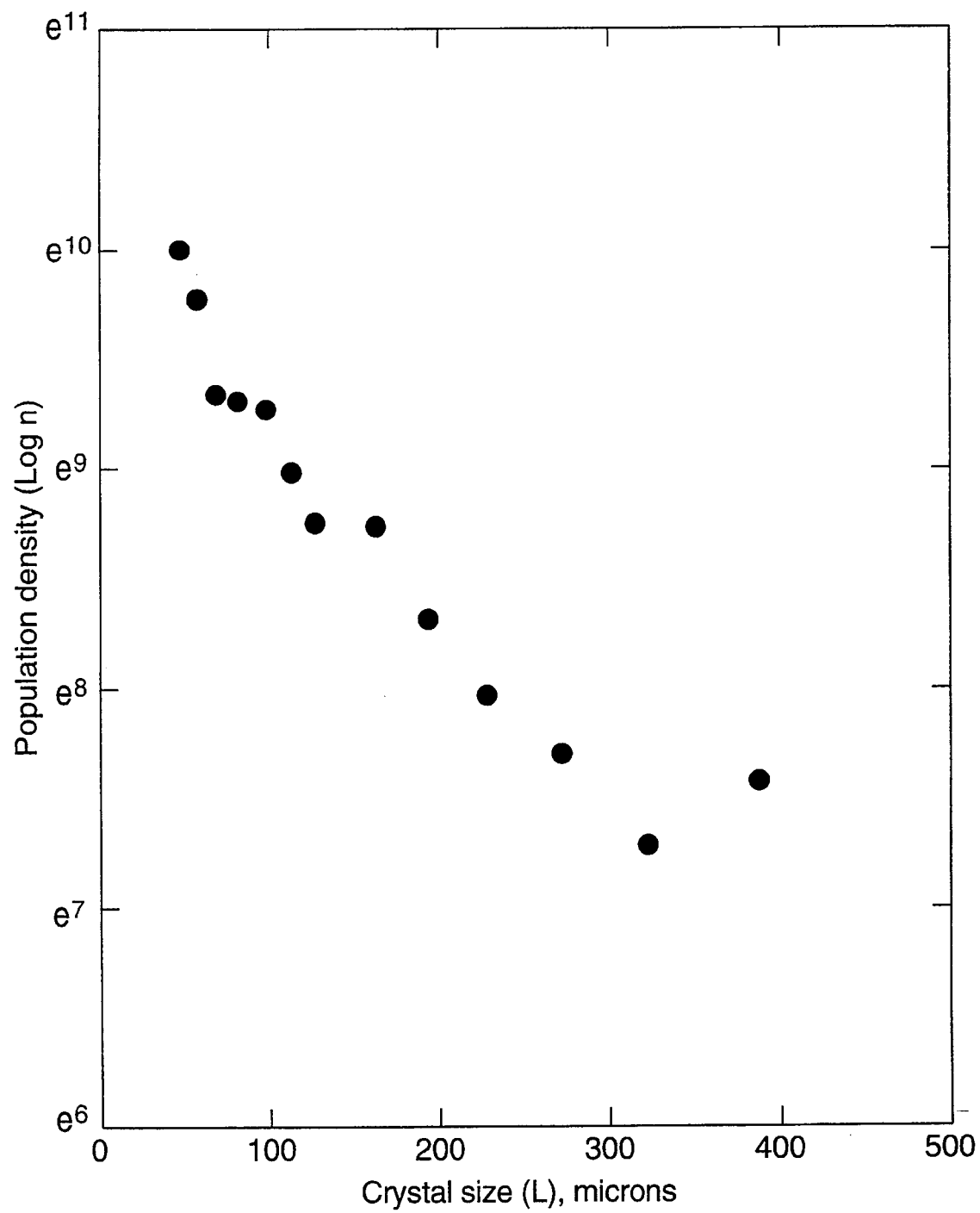
FIG. 11 is a plot of the population density as a function of crystal size of CaADS precipitated under the crystallization conditions of FIG. 10.

The DDO ratio was varied. In a first experiment, a DDO ratio of 10 was used. In a second experiment, the DDO ratio was adjusted to 15 in order to examine the influence of the DDO ratio on the product mean size and vessel slurry density. Plots of cumulative weight versus crystal size for the precipitation of N-S compounds in a DDO crystallizer are shown in FIGS. 8 and 10. FIG. 8 describes the results of an experimental run where $\tau=1$ hour and R=10. The mass average crystal size of the CaADS precipitated in this experimental run was found to be 115 µm. When the DDO ratio was increased to R=15, the mass average crystal size was observed to increase to 127 µm (FIG. 10). The results of this experiment indicate that a substantial increase in the Sauter mean size may be achieved by varying the DDO ratio. However, at the higher value of R mixing was a problem due to the increased slurry density. Also, a lower residence time became necessary in order to remove a sufficient amount of the underflow slurry. Plots of the population density of the crystalline precipitates versus crystal size are given in FIGS. 9 and 11. FIG. 9 illustrates the results of the experimental run for R=10; FIG. 11 describes the results for R=15. The precipitation kinetics of N-S compounds in a DDO crystallizer can thus be estimated from these plots.

To confirm the precipitation of N-S compounds in the continuous DDO crystallizer, elemental analysis was performed on the samples obtained from the two experiments. Nitrogen to sulfur molar ratios (N/S) were calculated to be 0.44 and 0.48 for the precipitates obtained with R=10 and R=15, respectively. This confirmed our assumption that the precipitation of N-S compounds is likely to occur as CaADS.

In order to evaluate the filterability of the N-S containing precipitates obtained in the DDO crystallizer, a series of filtration tests were also performed with the product slurry. The influence of commercial filtration aids, such as diatomaceous earths, on the filtration rate of the slurry was examined and demonstrated to provide noticeable improvements. For example, in the presence of 1% diatomaceous earth there was almost a three fold reduction in the filtration time required for the product slurry.

With reference to the hydrolysis of CaADS in a sulfuric acid solution, it is known that the conversion of precipitated CaATS and CaADS to ammonium sulfate may be achieved by the following reaction pathways. ATS is first hydrolyzed to ADS by:

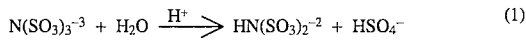

$$N(SO_3)_3^{-3} + H_2O \xrightarrow{H^+} HN(SO_3)_2^{-2} + HSO_4^- \quad (1)$$

This acid-catalyzed reaction occurs rapidly, even under neutral solution conditions and at room temperature. ADS then hydrolyzes irreversibly yielding sulfamate, as shown below:

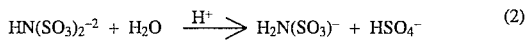

$$HN(SO_3)_2^{-2} + H_2O \xrightarrow{H^+} H_2N(SO_3)^- + HSO_4^- \quad (2)$$

The sulfamate undergoes hydrolysis to form ammonium and sulfate ions by a mechanism involving a pre-equilibrium phase between sulfamate ion and sulfamic acid, followed by slow hydrolysis of the acid:

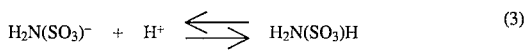

$$H_2N(SO_3)^- + H^+ \rightleftharpoons H_2N(SO_3)H \quad (3)$$

$$H_2N(SO_3)H + H_2O \longrightarrow NH_4^+ + HSO_4^- \quad (4)$$

From the hydrolysis mechanisms, it is difficult to describe the hydrolysis of N-S compounds precipitated from the scrubbing liquor in terms of reagents because the precipitates contain various species of N-S compounds at different concentrations. It is noted, though, that $NH_4^+$ is an end product which forms only from the decomposition of the N-S compounds by hydrolysis. Thus, the concentration of $NH_4^+$ in a hydrolyzed crop can be used as a measure of overall hydrolysis.

The extent of hydrolysis of the precipitate from N-S compounds was found to be insensitive to the initial concentration of the reactants. Thus, the overall kinetics for conversion of N-S compounds to ammonium sulfate, which covers all the steps in equations (1)–(4), may be represented as a first order irreversible reaction in terms of the concentration of N-S compounds, showing that hydrolysis of N-S compounds follows first-order kinetics.

The experimental setup for the hydrolysis of N-S compounds consisted of a one-liter jacketed glass reactor equipped with a temperature probe and controller for regulating the temperature of the reaction mixture at a predetermined setpoint. In order to minimize liquid losses from evaporation, a condenser tube was included. To begin, 500 ml of 1M $H_2SO_4$ was introduced inside the glass reactor and heated to about 95°–100° C. The hydrolysis reaction was initiated by adding 10 grams of uniform-size dry crystalline N-S containing precipitate obtained from the DDO crystallizer. A magnetic stirring bar was used to keep the slurry uniformly mixed. A five-ml liquid sample was drawn at various predetermined times during the reaction. The samples were analyzed for ammonia-nitrogen concentration, which was calculated according to EPA Method No. 4500-NH3F.

Figure 12:
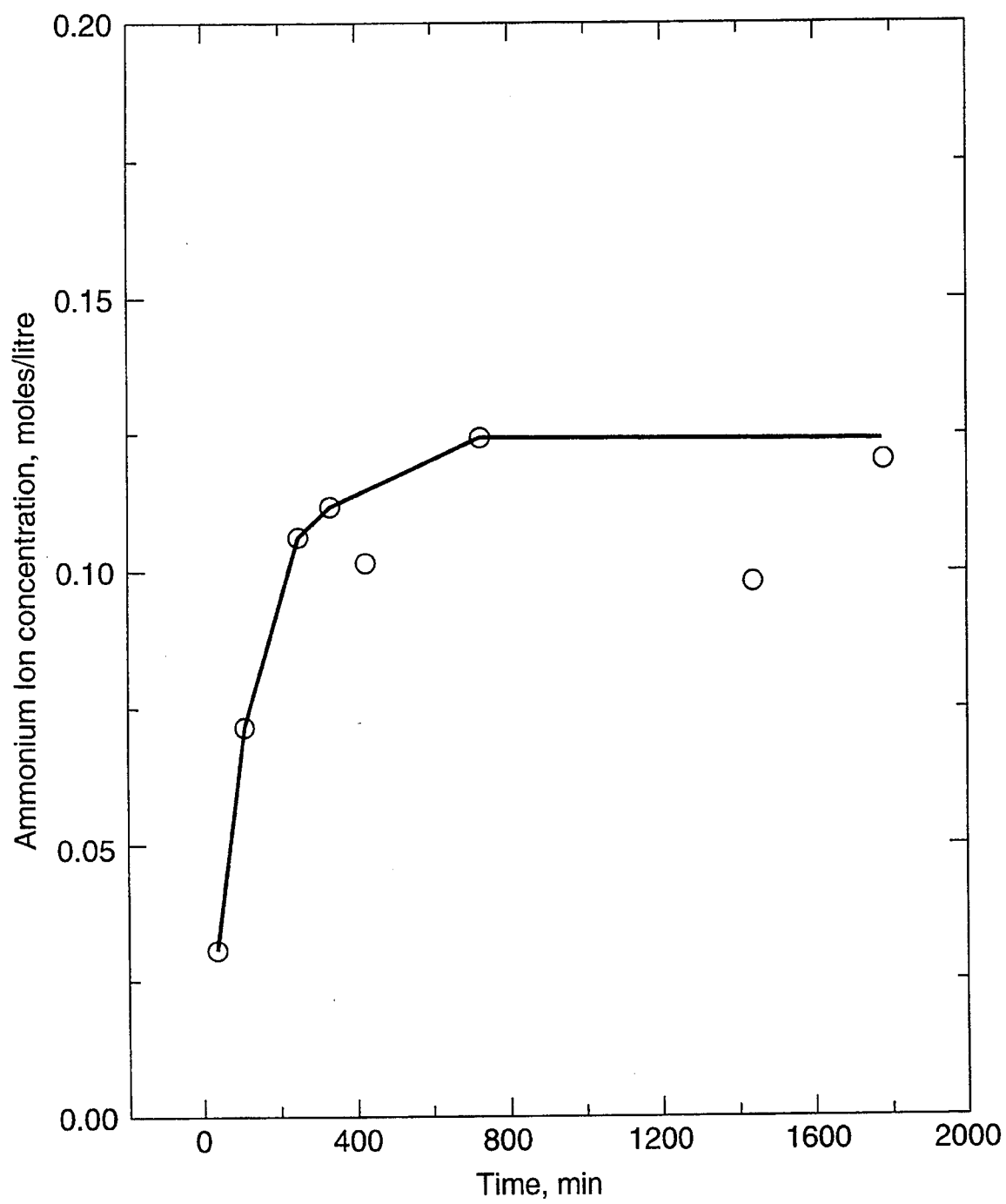
FIG. 12 is a plot of the hydrolysis profile of CaADS in one-molar sulfuric acid at approximately 95° C. based on ammonium ion concentration.

The results of the hydrolysis of N-S compounds are shown in FIG. 12. It is clear from the figure that at time zero no $NH_4^+$ ion was present in solution. The concentration of $NH_4^+$ increased very rapidly during the initial stage of the hydrolysis and then reached a plateau, indicating the completion of hydrolysis. From FIG. 12, it is seen that the hydrolytic process under these conditions reaches completion within 12 hours. FIG. 12 also confirms that the hydrolysis of N-S compounds follows first-order kinetics.

Figure 13:
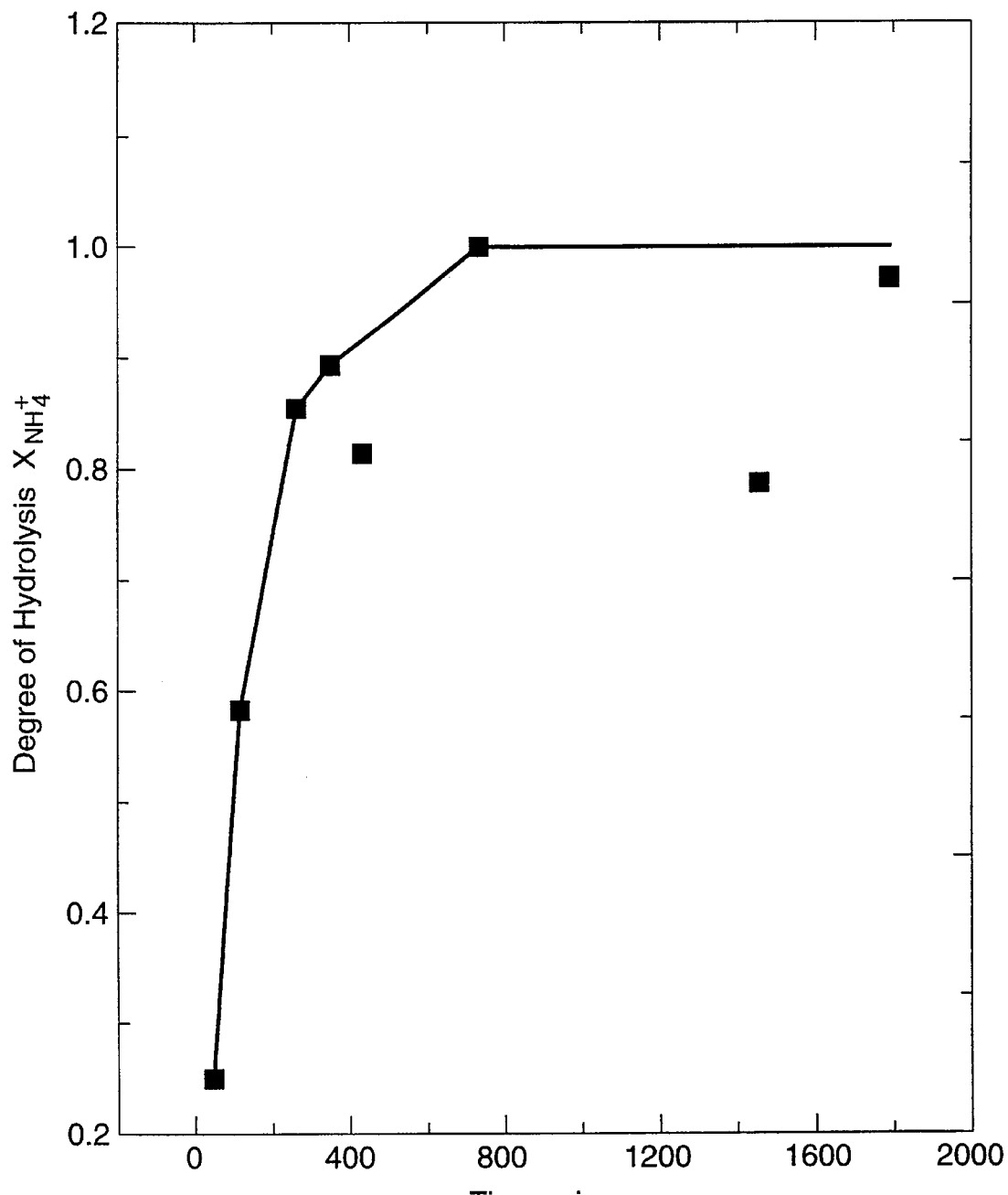
FIG. 13 is a plot of the degree of hydrolysis of CaADS in one-molar sulfuric acid at approximately 95° C. as a function of time.

The progress of hydrolysis versus time is shown in the plot of FIG. 13. It is noted that almost 90% of the hydrolysis was completed within 6 hours; that is, in about half the time required for complete hydrolysis. We also found that the process of hydrolysis is optimized by conditions approximating the boiling point of the sulfuric solution. Therefore, under atmospheric pressure it is recommended that it be carried out at a temperature of at least 90° C., preferably approaching the boiling point of the solution. As expected from this finding, it also follows that the time required for complete hydrolysis may be reduced by conducting the reaction at a higher pressure and a higher temperature. When performed under pressure in an autoclave at about 115° C., 90% percent of hydrolysis was reached in about 2.5 hours.

While the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

What we claim is:

1. A method for regenerating a spent flue-gas liquor containing nitrogen and sulfur compounds in solution after separation of sulfite/sulfate waste product derived from a process for removing nitrogen and sulfur oxides from a flue gas by contact with a calcium and Fe (II) EDTA containing aqueous scrubbing solution in a scrubber, comprising the following steps:

adding a first slurry of calcium components selected from the group consisting of lime, limestone or mixtures thereof to said spent flue-gas liquor in a crystallizer, thereby producing a crystallizer slurry comprising calcium-amine-sulfonate salt crystals in a regenerated scrubbing solution, wherein said crystallizer is maintained approximately at a pH between 8.0 and 9.1;

filtering said crystallizer slurry to separate said calcium-amine-sulfonate salt crystals from said regenerated scrubbing solution; and recycling said regenerated scrubbing solution to the scrubber.

2. The method of claim 1, wherein said crystallizer is maintained approximately at a pH of 8.3.

3. The method of claim 1, wherein said crystallizer is a double draw-off crystallizer.

4. A method for regenerating a spent flue-gas liquor containing nitrogen and sulfur compounds in solution derived from a process for removing nitrogen and sulfur oxides from a flue gas by contact with a calcium and Fe (II) EDTA containing aqueous scrubbing solution in a scrubber, comprising the following steps:

adding a first slurry of calcium components selected from the group consisting of lime, limestone or mixtures thereof to said spent flue-gas liquor in a crystallizer, thereby producing a crystallizer slurry comprising calcium-amine-sulfonate salt crystals in a regenerated scrubbing solution:

filtering said crystallizer slurry to separate said calcium-amine-sulfonate salt crystals from said regenerated scrubbing solution;

recycling said regenerated scrubbing solution to the scrubber;

after filtration, hydrolyzing said calcium-amine-sulfonate salt crystals in a sulfuric acid solution in a hydrolyzer, thereby producing a slurry of calcium sulfate crystals in a sulfuric-acid/ammonium-sulfate solution;

filtering the slurry produced by hydrolysis to separate said calcium sulfate crystals from said sulfuric-acid/ammonium sulfate solution; and evaporating said sulfuric-acid/ammonium-sulfate solution to cause precipitation of ammonium sulfate crystals.

5. The method of claim 4, wherein said crystallizer is maintained approximately at a pH between 8.0 and 9.1.

6. The method of claim 4, wherein said crystallizer is a double draw-off crystallizer maintained approximately at a pH of 8.3.

7. The method of claim 4, wherein said hydrolyzer is maintained at a temperature above about 90 degrees Celsius.

8. The method of claim 4, wherein said sulfuric acid solution is approximately 0.1 to 18.0 molar.

9. The method of claim 4, wherein said sulfuric acid solution is approximately one molar.

10. The method of claim 4, wherein said hydrolyzer is maintained at a temperature approaching a boiling point of said sulfuric acid solution under a pressure greater than atmospheric.

11. The method of claim 4, further comprising the step of recycling at least a portion of said sulfuric-acid/ammonium-sulfate solution to said hydrolyzer.

12. A method for regenerating a spent flue-gas liquor containing nitrogen and sulfur compounds in solution derived from a process for removing nitrogen and sulfur oxides from a flue gas by contact with a calcium and Fe (II) EDTA containing aqueous scrubbing solution in a scrubber, comprising the following steps:

adding a first slurry of calcium components selected from the group consisting of lime, limestone or mixtures thereof to said spent flue-gas liquor in a crystallizer, thereby producing a crystallizer slurry comprising calcium-amine-sulfonate salt crystals in a regenerated scrubbing solution:

filtering said crystallizer slurry to separate said calcium-amine-sulfonate salt crystals from said regenerated scrubbing solution;

recycling said regenerated scrubbing solution to the scrubber;

after filtration, hydrolyzing said calcium-amine-sulfonate salt crystals in a first sulfuric acid solution in a hydrolyzer, thereby producing a slurry of calcium sulfate crystals in a sulfuric-acid/ammonium-sulfate solution;

filtering the slurry produced by hydrolysis to separate said calcium sulfate crystals from said sulfuric-acid/ammonium-sulfate solution;

combining at least a first portion of said sulfuric-acid/ammonium-sulfate solution with a second slurry of calcium components in a neutralizer vessel, thereby liberating ammonia gas; and sparging said ammonia gas into a second sulfuric acid solution in a precipitator to produce pure ammonium sulfate.

13. The method of claim 12, wherein said crystallizer is maintained approximately at a pH between 8.0 and 9.1.

14. The method of claim 12, wherein said crystallizer is a double draw-off crystallizer maintained approximately at a pH of 8.3.

15. The method of claim 12, wherein said hydrolyzer is maintained at a temperature above about 90 degrees Celsius.

16. The method of claim 12, wherein said first sulfuric acid solution is approximately 0.1 to 18.0 molar.

17. The method of claim 12, wherein said first sulfuric acid solution is approximately one molar.

18. The method of claim 12, wherein said hydrolyzer is maintained at a temperature approaching a boiling point of said first sulfuric acid solution under a pressure greater than atmospheric.

19. The method of claim 12, wherein said precipitator is maintained approximately at a pH between 4.5 and 5.5.

20. The method of claim 12, wherein air is blown into said neutralizer vessel to entrain said ammonia gas.

21. The method of claim 12, further comprising the step of recycling at least a second portion of said sulfuric-acid/ammonium-sulfate solution to said hydrolyzer.

22. The method of claim 21, wherein said first and second portions of sulfuric-acid/ammonium-sulfate solution are approximately equal.

23. The method of claim 21, wherein said crystallizer is a double draw-off crystallizer maintained approximately at a pH of 8.3 and at a temperature above about 90 degrees Celsius; said first sulfuric acid solution is approximately one molar; said precipitator is maintained approximately at a pH between 4.5 and 5.5; and said first and second portions of sulfuric-acid/ammonium sulfate solution are approximately equal.

* * * * *

UNITED STATES PATENT AND TRADEMARK OFFICE
CERTIFICATE OF CORRECTION

PATENT NO : 5,618,511

DATED : April 8, 1997

INVENTOR(S) : Randolph et al.

It is certified that error appears in the above-identified patent and that said Letters Patent is hereby corrected as shown below:

In Column 1, below the title, insert the paragraph --This invention was made with government support under Agreement No. DE-FG22-93PC925582 by the U.S. Department of Energy. The government has certain rights in the invention.--

Signed and Sealed this

Twenty-seventh Day of October, 1998

*Attest:*

BRUCE LEHMAN

*Attesting Officer*  *Commissioner of Patents and Trademarks*